United States Patent
Caldwell et al.

(10) Patent No.: US 9,328,720 B2
(45) Date of Patent: May 3, 2016

(54) FLUID-WORKING MACHINE WITH MULTI-LOBE RING CAM

(75) Inventors: Niall James Caldwell, Edinburgh (GB); Daniil Sergeevich Dumnov, Edinburgh (GB); William Hugh Salvin Rampen, Edinburgh (GB); Alasdair Ian Fletcher Robertson, Livingston (GB); Uwe Bernhard Pascal Stein, Edinburgh (GB); Robert George Fox, Peebles (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 0 days.

(21) Appl. No.: 13/059,569

(22) PCT Filed: Aug. 17, 2010

(86) PCT No.: PCT/GB2010/051359
§ 371 (c)(1),
(2), (4) Date: Feb. 17, 2011

(87) PCT Pub. No.: WO2012/022924
PCT Pub. Date: Feb. 23, 2012

(65) Prior Publication Data
US 2013/0149171 A1    Jun. 13, 2013

(51) Int. Cl.
*F04B 17/02* (2006.01)
*F04B 1/00* (2006.01)
(Continued)

(52) U.S. Cl.
CPC ................. *F04B 1/00* (2013.01); *F03C 1/0409* (2013.01); *F03C 1/053* (2013.01); *F03D 9/001* (2013.01);
(Continued)

(58) Field of Classification Search
CPC ........ F03C 1/0409; F03C 1/053; F03D 9/001; F04B 1/0413; F04B 11/0066; F04B 17/02
USPC ......... 417/236, 237, 238, 239, 218, 221, 269, 417/270, 505; 60/398; 92/72, 129
See application file for complete search history.

(56) References Cited

U.S. PATENT DOCUMENTS

| 4,003,351 A | 1/1977 | Gunther |
| 4,048,906 A | 9/1977 | Firth et al. |

(Continued)

FOREIGN PATENT DOCUMENTS

| AU | 641438 | 9/1990 |
| CN | 101655069 | 2/2010 |

(Continued)

OTHER PUBLICATIONS

U.S. Appl. No. 13/030,774, filed Feb. 18, 2011, Caldwell, et al.
(Continued)

*Primary Examiner* — Patrick Hamo
(74) *Attorney, Agent, or Firm* — Hauptman Ham, LLP (57) ABSTRACT

A fluid-working machine for a renewable energy generation device, the fluid-working machine comprising a ring cam and a plurality of working chambers, the ring cam having an annular working surface extending around an axis of rotation of the ring cam, the annular working surface defining a plurality of waves, each working chamber having a piston, each piston in operative engagement with the ring cam working surface, the ring cam and working chambers being mounted to rotate relative to each other, cycles of working chamber volume being thereby coupled to rotation of the ring cam relative to the working chambers, characterized in that the individual waves of the ring cam working surface have an asymmetric profile.

25 Claims, 3 Drawing Sheets

(51) Int. Cl.
*F03C 1/30* (2006.01)
*F03C 1/053* (2006.01)
*F03D 9/00* (2016.01)
*F04B 1/04* (2006.01)
*F04B 1/053* (2006.01)
*F04B 49/06* (2006.01)
*F04C 23/02* (2006.01)
*F16H 39/02* (2006.01)

(52) U.S. Cl.
CPC .............. *F04B 1/0413* (2013.01); *F04B 1/053* (2013.01); *F04B 17/02* (2013.01); *F04B 49/065* (2013.01); *F04C 23/02* (2013.01); *F05B 2250/711* (2013.01); *F05B 2250/712* (2013.01); *F05B 2260/406* (2013.01); *F16H 39/02* (2013.01); *Y02E 10/721* (2013.01)

(56) References Cited

U.S. PATENT DOCUMENTS

| | | | |
|---|---|---|---|
| 4,104,956 | A | 8/1978 | Kato et al. |
| 4,192,203 | A | 3/1980 | Dailey |
| 4,287,792 | A | 9/1981 | Dailey |
| 4,359,312 | A | 11/1982 | Funke et al. |
| 4,503,673 | A * | 3/1985 | Schachle et al. ............... 60/398 |
| 4,503,751 | A | 3/1985 | Pinson |
| 4,598,628 | A * | 7/1986 | Courtright ....................... 91/481 |
| 4,781,025 | A | 11/1988 | Christ |
| 5,190,446 | A * | 3/1993 | Salter et al. .................... 417/297 |
| 5,259,738 | A * | 11/1993 | Salter et al. .................... 417/505 |
| 5,259,739 | A * | 11/1993 | Coates et al. ..................... 418/1 |
| 5,529,029 | A * | 6/1996 | Rowe et al. .................. 123/54.3 |
| 5,657,681 | A | 8/1997 | Henricson |
| 6,006,429 | A | 12/1999 | Duell et al. |
| 6,394,762 | B1 * | 5/2002 | Collingborn et al. ......... 417/254 |
| 6,637,313 | B1 * | 10/2003 | Kerr .................................. 92/72 |
| 6,837,141 | B1 | 1/2005 | Edelson |
| 7,863,767 | B2 | 1/2011 | Chapple et al. |
| 8,074,450 | B2 * | 12/2011 | Nies et al. ........................ 60/398 |
| 2009/0092511 | A1 | 4/2009 | Jiang |
| 2010/0032959 | A1 | 2/2010 | Nies et al. |
| 2010/0040470 | A1 | 2/2010 | Nies et al. |

FOREIGN PATENT DOCUMENTS

| | | |
|---|---|---|
| DE | 3113737 | 10/1982 |
| DE | 4026264 | 2/1992 |
| EP | 0692071 | 3/1994 |
| EP | 1072787 | 1/2001 |
| EP | 1101939 | 5/2001 |
| EP | 2151574 | 7/2009 |
| EP | 2154368 | 7/2009 |
| EP | 2 151 574 | 2/2010 |
| EP | 2 154 368 | 2/2010 |
| EP | 2154368 A2 * | 2/2010 |
| FR | 372703 | 2/1906 |
| GB | 391529 | 5/1933 |
| GB | 1026964 | 4/1966 |
| GB | 1255006 | 3/1968 |
| GB | 1261172 | 1/1972 |
| GB | 2 046 353 | 11/1980 |
| GB | 2046353 | 11/1980 |
| JP | S489048 | 3/1973 |
| JP | 4159191 | 6/1992 |
| JP | H8508557 | 9/1996 |
| JP | 2005248738 | 9/2005 |
| WO | 9423198 | 10/1994 |
| WO | 96029515 | 9/1996 |
| WO | 2004025122 | 3/2004 |
| WO | WO2006002802 | 1/2006 |
| WO | 2011104543 | 9/2011 |
| WO | 2011104546 | 9/2011 |
| WO | 2011147996 | 12/2011 |
| WO | 2011147997 | 12/2011 |
| WO | 2012060685 | 5/2012 |

OTHER PUBLICATIONS

International Search Report Issued Oct. 11, 2011 in PCT/GB10/51359 filed Aug. 17, 2010.

Rampen, Taylor, Riddoch, "Gearless transmission for large wind turbines" DEWEK, Bremen, 2006.

Rampen, Almond, Taylor, Ehsan and Salter "Progress on the Development of the Wedding-cake Digital Hydraulic Pump/Motor", 2nd European Wave Power Conference, Lisbon, Nov. 8-10, 1995.

Salter, "Proposal for a Large, Vertical-Axis Tidal-Stream Generator with Ring-Cam Hydraulics" Third European Wave Energy Conference, Sep. 30-Oct. 2, 1998, Patras, Greece.

* cited by examiner

FLUID-WORKING MACHINE WITH MULTI-LOBE RING CAM

FIELD OF THE INVENTION

The invention relates to multi-lobe ring cams for fluid-working machines and to fluid-working machines including such ring cams. The invention is particularly applicable where the fluid-working machines are large, for example, pumps or motors in renewable energy extraction devices, such as wind turbines.

BACKGROUND TO THE INVENTION

Fluid-working machines include fluid-driven and/or fluid-driving machines, such as pumps, motors, and machines which can function as either a pump or as a motor in different operating modes.

When a fluid-working machine operates as a pump, a low pressure manifold typically acts as a net source of a working fluid and a high pressure manifold typically acts as a net sink for a working fluid. When a fluid-working machine operates as a motor, a high pressure manifold typically acts as a net source of a working fluid and a low pressure manifold typically acts as a net sink for a working fluid. Within this description and the appended claims, the terms "high pressure" and "low pressure" are relative, and depend on the particular application. In some embodiments, low pressure working fluid may be at a pressure higher than atmospheric pressure, and may be several times atmospheric pressure. However, in all cases, low pressure working fluid will be at a lower pressure than high pressure working fluid. A fluid-working machine may have more than one low pressure manifold and more than one high pressure manifold.

Large displacement ring cam fluid-working machines (i.e. fluid-working machines having a large rotating annular cam driving a plurality of radial pistons arranged around the cam, with each piston typically reciprocating multiple times per cam revolution) are known and are proposed for use in renewable energy applications in which there is a low speed rotating input but a relatively high speed electrical generator (Rampen, Taylor & Riddoch, *Gearless transmissions for wind turbines*, DEWEK, Bremen, December 2006). Ring cam fluid-working machines typically have a plurality of rollers rolling on a wave shaped cam and operatively connected to pistons. Each piston is slideably engaged in a cylinder, the cylinder and piston together defining a working chamber containing working fluid, in communication via one or more valves with high and low pressure manifolds. The pistons are each operable to undergo reciprocating motion within the cylinder so as to vary the working chamber volume, when the ring cam rotates, such that a cycle of working chamber volume is executed, and during which working fluid may be displaced.

Ring cam fluid-working machines may be configured so that the pistons and cylinders are located inside the ring cam, the ring cam having an inward facing working surface, or may be configured so that the ring cam has an outward facing working surface and is located inside the pistons and cylinders. Indeed, ring cam fluid-working machines of either configuration are also known in which either the ring cam rotates, or the pistons and cylinders rotate. It is also possible for the ring cam to have both inward and outward facing working surfaces where the ring cam is located between inner and outer rings of pistons and cylinders. It is even possible for the pistons and cylinders to be aligned roughly parallel with the axis of rotation, and for the ring cam to have one or more axially facing working surfaces.

Multi-cylinder fluid-working machines, including ring cam fluid-working machines, may be variable displacement fluid-working machines (either pumps or motors, or machines operable as either pumps or motors), wherein each working chamber is selectable to execute an active (or part-active) cycle of working chamber volume in which there is a net displacement of working fluid, or an idle cycle in which there is substantially no net displacement of working fluid, by the working chamber during a cycle of working chamber volume, for regulating the time-averaged net displacement of fluid from the low pressure manifold to the high pressure manifold or vice versa.

Large fluid-working machines (such as those suitable for renewable energy generation) are typically subject to particularly high internal forces and pressures. For example, the pressure of the high (and indeed low pressure) working fluid of a large scale ring cam fluid-working machine, of a size suitable for a wind turbine, is particularly high. Consequently the forces received by the ring cam from the rollers are also high, and it is known for the ring cam working surfaces to degrade. It has been proposed to assemble large scale ring cams from a number of segments, and it is known for excessive wear to occur to the roller and to the working surface due to discontinuities which appear on the working surface under pressure of a roller at the interface between segments.

In particular, when the operating pressure of ring cam fluid working machines is very high (for example, higher than 300 Bar), the repetitive surface stress (Hertzian stress) in the ring cam and roller can exceed levels (for example, 1.5 GPa) which allow a long working life for the ring cam. Additionally, it is desirable to have a high number of lobes on the ring cam (shortest wavelength) to increase the speed multiplication factor (the factor by which the working chamber cycle frequency is increased over the shaft rotation rate), but the Hertzian stress in the working surface increases with increasing slope of the ring cam surface. Thus it is not possible simply to make the rollers larger for the same size of piston, because the piston would anyway only apply force to the roller over the same area, nor to have more or higher amplitude waves, or the machine would become larger and heavier. The curvature of the cam is also important in that the curvature of the cam determines the contact area between the cam and the roller.

Accordingly, there remains a need for a fluid-working machine and a ring cam for a radial fluid-working machine of minimum weight, maximum speed multiplication factor, and having extended working lifetime.

SUMMARY OF THE INVENTION

According to a first aspect of the present invention there is provided a fluid-working machine for a renewable energy generation device, the fluid-working machine comprising a ring cam and a plurality of working chambers, the ring cam having an annular working surface extending around an axis of rotation of the ring cam, the annular working surface defining a plurality of waves, each working chamber having a piston, each piston in operative engagement with the ring cam working surface (typically, via a cam engaging element, such as a roller or piston shoe which is integral to the respective piston), the ring cam and working chambers being mounted to rotate relative to each other, cycles of working chamber volume being thereby coupled to rotation of the ring cam relative to the working chambers, characterised in that the individual waves of the ring cam working surface have an asymmetric profile.

By the individual waves of the ring cam working surface having an asymmetric profile we refer to the profile (i.e. the working surface) of individual waves not being symmetric under reflection through a maximum or minimum. The profile of the plurality of waves are typically the same as each other and so the working surface (comprising a plurality of waves) may be rotationally symmetric.

Thus, during use of the machine, the variation of working chamber volume during a cycle of individual working chamber volume is not symmetric in time. This contrasts with known machines having working surfaces comprising waves with symmetrical profiles in which the duration of exhaust and intake strokes of the working chambers is the same, and where the magnitude of the rate of change of volume of the working chamber is the same at corresponding times in the exhaust and intake strokes.

The fluid-working machine has a first operating mode. The first operating mode may be pumping. The first operating mode may be motoring. The fluid-working machine may have only the first operating mode. However, the fluid-working machine may have a second operating mode. If the first operating mode is pumping, the second operating mode may be motoring. If the first operating mode is motoring, the second operating mode may be pumping. The ring cam may rotate in the same sense relative to the working chambers in both the first and the second operating modes. In this case, the first operating mode is typically the dominant operating mode. Thus, the fluid-working machine may be designed to operate with rotation of the ring cam relative to the working chambers in a first sense the majority of the time, but may be usable with rotation of the ring cam relative to the working chambers in a second sense. For example, the fluid-working machine may operate as a pump in the dominant operating mode but also be usable as a motor, with the ring cam rotating in the opposite sense relative to the working chambers, when motoring. Such a fluid-working machine is useful in the nacelle of a wind turbine, for example, where it may be driven by the blades as a pump in normal use but occasionally be used to slowly drive the blades to a desired configuration. The machine may be a machine which operates more efficiently or has a longer operating lifetime in the first operating mode than the second operating mode due to the profile of the waves of the ring cam. Thus, the profile of the waves of the ring cam may be optimised for use in the dominant operating mode but the machine may be operable, typically less efficiently, in a second operating mode in which the ring cam rotates in the opposite sense relative to the working chambers.

The machine may be operated in the dominant mode more than 10 times, and preferably more than 100 times, as much of the time as it is operated in the second mode.

The ring cam working surface comprises a plurality of waves having minima and maxima of radius relative to the axis of rotation. The working chamber volume cycles between a maximum when the cam engaging elements engage with the ring cam at bottom dead centres (BDC), and a minimum when the cam engaging elements engage with the ring cam at top dead centres (TDC). Typically, for an outward facing ring cam working surface, a plurality of pistons are arranged outside the ring cam and the minima of radius define bottom dead centres (BDC) of cycles of working chamber volume and the maxima of radius define top dead centres (TDC) of cycles of working chamber volume. Typically, for an inward facing ring cam working surface, a plurality of pistons are arranged inside the ring cam and the maxima of radius define bottom dead centres (BDC) of cycles of working chamber volume and the minima of radius define top dead centres (TDC) of cycles of working chamber volume. A ring cam may have both inwards and outward facing ring cam working surfaces. Thus, the fluid-working machine is typically a radial piston machine. However, a ring cam may have a plurality of pistons arranged generally parallel to the axis of rotation of the ring cam and one or more laterally facing working surfaces. The plurality of pistons are typically radially arranged around the ring cam, and usually equally spaced.

Preferably, each working chamber has a volume which varies cyclically with reciprocating movement of the respective piston. Preferably, each piston is slidably mounted within a cylinder, such that a working chamber is defined between the cylinder and piston. Typically, the fluid-working machine comprises a body and the or each cylinder may be formed in the body. For example, the body may comprise or consist of a cylinder block. In some embodiments, the or each cylinder, or the or each piston, may be articulated (typically via a spherical bearing). The or each piston may be restrained within the body.

The volume of the working chamber varies cyclically with rotation of the ring cam. The fluid-working machine comprises a low pressure manifold and a high-pressure manifold, and a plurality of valves for regulating the flow of fluid between each working chamber and the low pressure and high-pressure manifold. Preferably the plurality of valves are pressure-operated check valves, openable in one direction due to pressure across said valves. Preferably the high-pressure valves (i.e. those valves regulating the flow between the high pressure manifold and the working chamber) are openable to allow fluid from the working chamber into the high-pressure manifold, when the pressure in said working chamber exceeds the pressure in the high pressure manifold. Preferably the low-pressure valves (i.e. those valves regulating the flow between the low pressure manifold and the working chamber) are openable to allow fluid from the low pressure manifold into the working chamber, when the pressure in said working chamber falls below the pressure in said low-pressure manifold.

Typically, at least one said valve associated with each working chamber is an electronically controlled valve. The fluid-working machine typically comprises a controller operable to control one or more said electronically controlled valves, on each cycle of working chamber volume and in phased relation to cycles working chamber volume, to select the net volume of working fluid displaced by each working chamber on each volume cycle. Typically, at least one said electronically controlled valve associated with each working chamber is an electronically controlled poppet valve. It may be that said electronically controlled valves are direct acting fast moving face-sealing poppet valves that are not openable against a substantial pressure difference (e.g. not operable against a pressure of 10 bar). Thus, typically the controller is operable to selectively hold open or close said electronically controlled high-pressure valves, but not to open them against pressure in the high pressure manifold, and typically the controller is operable to selectively close or hold closed said electronically controlled low-pressure valves, but not to open them against pressure in the working chamber.

When the low-pressure valves are held open for a full cycle of working chamber volume, the working chamber conducts an idle stroke in which there is no net displacement of fluid between the low- and high-pressure manifolds. To transfer fluid from the low-pressure manifold to the high pressure manifold, the controller must selectively close the low-pressure valve in a contracting stroke of the working chamber, which may cause the high-pressure valve to open to exhaust fluid to the high-pressure manifold in a so-called pumping stroke. The controller may then, if electronically controlled high-pressure valves are employed, selectively hold open said high-pressure valves during the subsequent intake stroke to accept fluid from the high-pressure manifold in a so-called motoring stroke.

The controller is preferably operable, in the dominant operating mode, to selectively command only one of a pumping stroke or a motoring stroke (except that a motoring stroke preferably starts with a very small pumping stroke). In some embodiments the controller is operable, in the alternative operating modes, to selectively command the other of a pumping stroke or a motoring stroke.

The waves have opposite first and second faces, each face extending between a maximum and an adjacent minimum. It may be that for each wave the first and second face have different arc lengths. In this case, as the ring cam is typically rotated relative to the working chambers at a substantially constant angular velocity the intake and exhaust strokes will have different durations.

Typically, all of the waves have the same profile and the arc length of each first face is the same and the arc length of each second face is the same. However, it may be that some or all of the waves have first faces with different arc lengths. It may be that some or all of the waves have second faces with different arc lengths.

Preferably, one of the first and second faces is a working face on which the cam following elements bear when the pressure in the working chamber most exceeds the pressure in the low-pressure manifold and the other face is a breathing face.

Preferably the arc length of the working faces is larger than the arc length of the breathing faces. Preferably the arc length of the working faces is more than 10%, and more preferably 20%, larger than the arc length of the breathing faces. Preferably, the working faces extend for more than half of the arc of the ring cam (and typically for >55% or >60% of the arc of the ring cam), and the breathing faces extend for less than half of the arc of the ring cam (and typically <45% or <40% of the working surface). Preferably, the working faces extend over less than two thirds of the arc of the ring cam.

Thus, as the arc length of the working faces is typically larger than the arc length of the breathing faces, the mean slope of the working faces is typically less than the slope of the breathing faces. The Hertzian stress (e.g. mean Hertzian stress or peak Hertzian stress) in the working surface of ring cam fluid working machines is thus less than would be the case for known fluid-working machines in which the working and breathing faces have a similar arc length. The side loads of the piston against the cylinder are also reduced.

In machines which are pumps, or in which the dominant operating mode is pumping and which have an outward facing ring cam working surface, the working faces extend between a maximum of working chamber radius and the next minimum of working chamber radius around the ring cam in the direction of relative rotation (the sense in which the ring cam moves relative to the working chambers if the working chambers are fixed and the ring cam rotates and the opposite sense to which the working chambers rotate if the ring cam is fixed and the working chambers rotate). Where the ring cam working surface faces inwards, the working faces extend between a minimum of working chamber radius and the next maximum of working chamber radius around the ring cam in the direction of relative rotation.

In this case, the exhaust stroke of each working chamber corresponds with the cam engaging elements bearing on the working faces. Preferably, the working faces have a greater arc length than the breathing faces. Thus, the exhaust stroke is preferably longer than the intake stroke.

In machines which are motors, or in which the dominant operating mode is motoring and which have an outward facing ring cam working surface, the working faces extend between a minimum of working chamber radius and the next maximum of working chamber radius around the ring cam in the direction of relative rotation Where the ring cam working surface faces inwards, the working faces extend between a maximum of working chamber radius and the next minimum of working chamber radius around the ring cam in the direction of relative rotation.

In this case, the intake stroke of each working chamber corresponds with the cam engaging elements bearing on the working faces. Again, the working faces preferably have a greater arc length than the breathing faces. Thus, the intake stroke is preferably longer than the exhaust stroke.

It may be that the pressure within a working chamber remains significantly above the low pressure manifold pressure while the respective cam engaging element bears on a first part (the part it first bears on) of the breathing faces. It may be that the pressure within a working chamber remains close to or below the low pressure manifold while the respective cam engaging elements bears on a first part (the part it first bears on) of the working faces. This can arise due to the (slight) compressibility of practical working fluids. Thus, the rate of change of pressure within a working chamber with time may reach zero when the respective cam engaging element has passed 1.0-10.0% of the arc length of an entire wave after top dead centre or bottom dead centre.

The fluid-working machine may be configured such that the cam engaging elements bear on the breathing faces when (or only when) the respective working chamber is expanding (for example in embodiments where the fluid-working machine is a pump). The fluid working machine may be configured such that the cam engaging elements bear on the breathing faces when (or only when) the respective working chamber is contracting (for example, in embodiments where the fluid-working machine is a motor). The fluid-working machine may be configured such that, when rotation is in a first direction, the cam engaging elements bear on the breathing faces when (or only when) the respective working chamber is expanding, and when rotation is in a second direction, the cam engaging elements bear on the breathing faces when (or only when) the respective working chamber is contracting (for example, in embodiments where the fluid-working machine is a pump/motor operable as a pumping mode in a first direction of rotation and as a motor in a second direction of rotation).

The variations in radius between the maxima and minima are generally small relative to the diameter of the ring cam, for example, the difference between the radius at the maximum and the radius at the minima is typically <5% of the mean radius of the ring cam.

Within this specification, we refer to the change in radius with angular position relative to the axis of rotation, $dr/d\alpha$ as the slope of the ring cam working surface. Preferably, the rate of change of slope with angle, $d^2r/d\alpha^2$ is continuous. This is significant because the rate of change of slope with angle dictates the acceleration of a cam engaging element which rolls or slides on the ring cam working surface. The rate of change of slope with angle should never be sufficiently negative to cause a cam following which rolls or slides on the ring cam working surface to disengage from the working surface.

Thus $(d^2r/d\alpha^2) \times (d\alpha/dt)$ ($d\alpha/dt$ is the angular rotation rate) is preferably less than the bias force biasing the cam engaging element against the working surface divided by the combined mass of the piston and cam engaging element. There may be regions where the slope is constant, for example, lands with no slope at or adjacent to minima or maxima, or regions of constant slope within the first or second faces, for example, at the middle of the first and second faces.

Because the difference in radius between the maxima and minima is typically small relative to the radius of the ring cam, the rate of change of slope with angle is typically very similar to the "curvature" of the working surface, i.e. the absolute value of the second derivative of the working surface radius, $|d^2r/d\alpha^2|$. An outward facing ring cam has convex portions of the working surface with $d^2r/d\alpha^2 < 0$ and concave portions with $d^2r/d\alpha^2 > 0$, whilst the opposite is true for an inward facing ring cam.

Preferably, for at least some (and typically each) wave a point or region of maximum slope magnitude (typically a slope inflection point or region) of the working surface intermediate a minimum and an adjacent maximum is not the same arc length from the minimum and from the said maximum.

Thus, the rate of change of working chamber volume (and thus typically also flow rate) is at a peak other than half way in time between each minimum and maximum (assuming the rate of rotation of the ring cam relative to the working chambers is substantially constant).

Preferably, each first face has a convex portion and a concave portion and the point or region of maximum slope magnitude is located intermediate said portions. Preferably, each second face has a convex portion and a concave portion and the point or region of maximum slope magnitude is located intermediate said portions. Preferably, each working face has a convex portion and a concave portion and the point or region of maximum slope magnitude is located intermediate said portions. Preferably, each breathing face has a convex portion and a concave portion and the point or region of maximum slope magnitude is located intermediate said portions.

Preferably the maximum curvature of the convex portions of the working faces is less than the maximum curvature of the convex portions of the breathing faces. Typically the maximum curvature of the convex portions of the working faces is less than half, or less than one third, of the maximum curvature of the convex portions of the breathing faces.

Typically the maximum curvature of the concave portions of the working faces is the same or greater than the maximum curvature of the breathing faces.

Because the cam engaging element makes an angle to the working surface compared to the working force it transfers to the piston, the Hertzian stress in the working surface increases with increasing slope of the working surface. Furthermore, the curvature of the working surface is important in that the curvature of the working surface determines the contact area between the working surface and a roller (being an example of a cam engaging element) passing over the working surface. Thus, by having a greater maximum curvature of the concave portions of the working face than the convex portions, the curvature of the convex portions, where the contact area is least and the Hertzian stresses greater, can be less than would otherwise be required given the constraint that the working surface has maxima and minima of a particular angular separation and particular difference in radius from the axis of rotation.

Preferably the maximum curvature of the convex portions of the working faces is less than the maximum curvature of the concave portions of the working faces. Typically the maximum curvature of the convex portions of the working faces is less than half, or less than one third, of the maximum curvature of the concave portions of the working faces.

Thus, the flow rate to or from the high pressure manifold via each working chamber, and therefore the torque applied to the rotatable ring cam, is preferably asymmetric in time and angle. This contrasts with conventional fluid-working machines using eccentric cams in which, typically to achieve a smoother aggregate flow rate to or from the high pressure manifold from a plurality of working chambers, the flow rate due to each working chamber is designed symmetric in time and angle.

Preferably, the angular separation (C) between a point or region of maximum slope magnitude of the working face and the adjacent BDC is less than the angular separation (D) between said point or region of maximum slope magnitude of the working face and the adjacent TDC. More preferably, C/D<90%. Thus, the maximum flow rate during exhaust strokes will typically occur before the respective working chamber volume is at the mean of the volume of the working chamber at top dead centre and at bottom dead centre.

Preferably, a maximum curvature of the working surface is not at a maximum or minimum of radius. Preferably, a maximum curvature of the working surface is angularly spaced from a maximum or minimum of radius by 1.0-10.0% of the angular separation of a wave. Preferably, a maximum curvature of the working surface is angularly spaced by 1.0-10.0% of the angular separation of a wave from each maximum or minimum of radius in the sense opposite to the sense of relative rotation (thus, so that the cam engaging elements bear on the curvature maxima shortly after TDC or BDC).

It may be that the point of maximum curvature intermediate a minimum and an adjacent maximum is not an angular separation half way between the said maximum and the said minimum. It may be that the maximum curvature of the working surface is not at a maximum or minimum of radius. A maxima of curvature of the working surface may be angularly spaced from a maximum or minimum of radius by 1.0-10.0% of the angular extent of a wave, typically in a sense opposite to the direction of relative rotation.

The fluid-working machine is typically part of a hydraulic circuit (for example it may be a pump driving fluid around a hydraulic circuit or a motor driven by fluid within a hydraulic circuit). The hydraulic circuit typically comprises a further fluid working machine, which may also be a fluid working machine according to the present invention. The hydraulic circuit typically further comprises a fluid accumulator. The fluid accumulator enables working fluid to be stored or received from the storage by the fluid working machine as required. The resulting ability to vary the total volume of working fluid in the remainder of the fluid circuit allows the hydraulic circuit to deal with time differences between the displacement of working fluid by the fluid-working machine and the displacement of working fluid by the further fluid working machine in the fluid circuit.

Typically, the working chambers are canted. They may for example be in the plane of the ring cam but not extent directly radially outwards. Preferably, the working chambers are canted in the direction such that the axis of piston movement between the points of maximum and minimum volume is closer to perpendicular to the working faces than to the breathing faces.

Preferably the radius profile of the ring cam working surface is selected so that, at least in use in the dominant operating mode, the working faces are subject to the lowest peak stress, and so that the flow of fluid through the valves (in particular the low-pressure valves) caused by the operable engagement of the pistons with the working surface causes the minimal energy loss.

Preferably, the controller is operable to control the timing of the opening or closing of the electronically controlled valves to counter fluctuations in torque and flow arising from the asymmetric flow of working fluid out of the working chamber during each cycle of working chamber volume. Typically the controller will receive feedback values of physical properties of the renewable energy device, such as positions, velocities and accelerations, and use said feedback values to select the opening and closing of the valves and thus schedule in time and angle the application of torque to the ring cam (and delivery or acceptance of flow to the high-pressure manifold) by the selected working chambers associated with said valves, to actively cancel the effects said asymmetric flow.

Preferably the fluid working machine is part of a hydraulic circuit comprising a fluid compliance. Typically fluid compliance comprises one or more gas accumulators. Preferably the ring cam is coupled to a large inertial load (or large inertial source), such that the energy transferred fluidically by one working chamber in use is much less (for example, one hundredth, or one thousandth) of the energy embodied in the inertial load (or source). Typically said large inertial source is a hub and blade assembly of a wind turbine or tidal energy device.

Thus, the flow rate to or from the high pressure manifold via each working chamber, and therefore the torque applied to the rotatable ring cam, may be asymmetric in time and angle (i.e. orientation of the ring cam relative to the working chambers), and thus cause the fluid working machine to produce a varying aggregate flow and torque in use, but the effect on the renewable energy device can be rendered negligible by the use of the above techniques and equipment.

Typically, each roller, or other cam engaging element, is biased against the ring cam working surface. For example, each roller, or other cam engaging element, may be biased against the working surface by an elastic member, such as a spring. Typically the elastic member biases each piston against each roller, or other cam engaging element, thereby biasing said roller (or other cam engaging element) against the working surface. Alternatively, or in addition, each roller (or other cam engaging element) and/or each piston, is biased against the working surface by fluid pressure from within the respective working chamber, throughout a part or all of a cycle of working chamber volume. Typically, fluid from within the respective working chamber is also in direct communication with each roller, or other cam engaging element, thereby to bias said roller, or other cam engaging element, against the working surface, and further to separate the roller, or other cam engaging element, from the piston. For example, each said piston may define a passageway extending from the working chamber and into fluid communication with the roller and the adjacent surface of the piston, so that high pressure fluid pools between the piston and the roller, and functions as a self-balancing fluid bearing.

In practice, the force exerted on each cam engaging element in use can be substantial. This force varies periodically during cycles of working chamber volume (and in some embodiments depends on the volume of fluid to be displaced by the working chamber on a particular cycle of working chamber volume selected by the controller).

In a second aspect, the invention extends to a kit of parts comprising a ring cam having an annular working surface defining a plurality of waves, the individual waves of the ring cam working surface having an asymmetric profile, and a working chamber mounting chassis comprising a plurality of cylinders, or cylinder mountings, which kit can be assembled to form a fluid-working machine according to the first aspect of the invention.

In a third aspect, there is provided a renewable energy generation device (such as a wind turbine) comprising a fluid-working machine according to the first aspect of the invention. The fluid-working machine may be coupled to a drive shaft driven by a renewable energy capture device, such as a shaft connected to the blades of a wind turbine to receive energy from a renewable energy source (e.g. wind). Within this specification and the appended claims by a renewable energy generation device we include, amongst other machines, machines which generate electricity from wind, such as wind turbines, or flowing water, such as tidal turbines or hydro-electric power generation turbines.

According to a fourth aspect of the present invention there is provided a ring cam having an axis of rotation and an annular working surface defining a plurality of waves, the individual waves of the ring cam working surface having an asymmetric profile. Optional features of the ring cam working surface and the said waves correspond to the features discussed above in relation to the first and second aspect of the invention.

The invention also extends in a fifth aspect to a method of operating a fluid-working machine comprising providing a fluid-working machine according to the first aspect of the invention and rotating the ring cam relative to the working chambers and thereby causing the volume of the working chambers to vary cyclically.

It may be that the working chambers remain fixed and the ring cam is rotated. It may be that ring cam remains fixed and the working chambers are rotated. It may be that both the ring cam and the working chambers are rotated.

It may be that the duration of the intake and exhaust strokes is different.

Preferably, the rate of flow of working fluid during an exhaust stroke peaks before the volume of the respective working chamber reaches the mean of its volume at top dead centre and bottom dead centre.

Optional features discussed in relation to any of the five aspects of the invention are optional features of any one of the five aspects of the invention.

BRIEF DESCRIPTION OF THE DRAWINGS

The invention will now be illustrated with respect to the following drawings in which.

DETAILED DESCRIPTION

Figure 1:
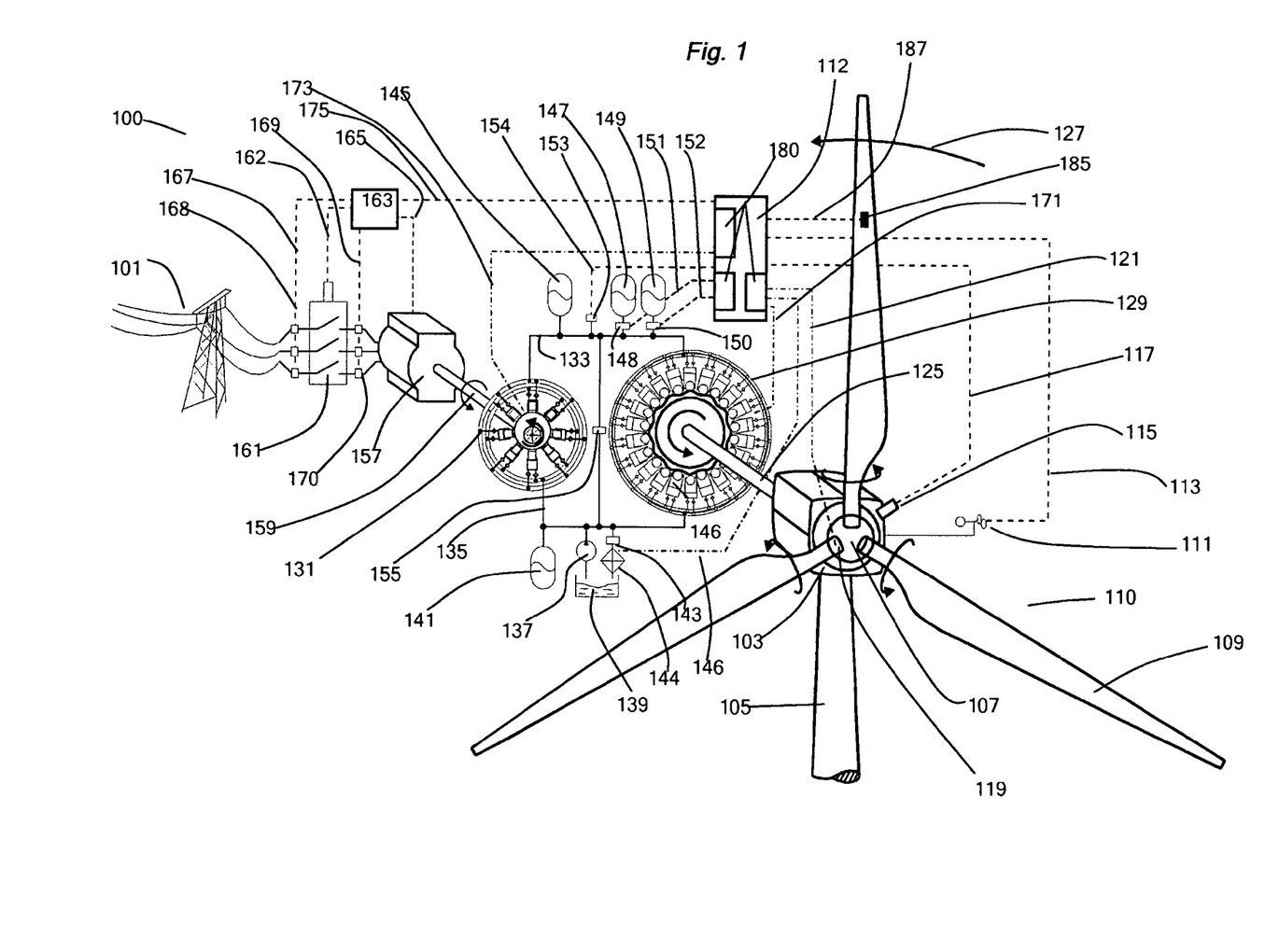
FIG. 1 shows a wind turbine generator connected to an electricity network and implementing the invention.

FIG. 1 illustrates an example embodiment of the invention in the form of a Wind Turbine Generator (WTG, 100), acting as the renewable energy device, and connected to an electricity network (101). The WTG comprises a nacelle (103) rotatably mounted to a tower (105) and having mounted thereon a hub (107) supporting three blades (109) known collectively as the rotor (110). An anemometer (111) attached externally to the nacelle provides a measured wind speed signal (113) to a controller (112). A rotor speed sensor (115) at the nacelle provides the controller with a rotor speed signal (117). In the example system the angle of attack of each of the blades to the wind can be varied by a pitch actuator (119), which exchanges pitch actuation signals and pitch sensing signals (121) with the controller. The invention could be applied to a WTG without a pitch actuator.

The hub is connected directly to a pump (129), through a rotor shaft (125), acting as the rotatable shaft, which rotates in the direction of rotor rotation (127). The pump is preferably of the type described with reference to FIG. 2, and has a fluid connection to a hydraulic motor (131), preferably of the type described in EP0494236. The fluid connection between the pump and the hydraulic motor is through a high pressure manifold (133) and a low pressure manifold (135), connected to their high pressure port and low pressure port respectively, and is direct in the sense that there are no intervening valves to restrict the flow. The pump and hydraulic motor are preferably mounted directly one to the other so that the high pressure manifold and low pressure manifold are formed between and within them. A charge pump (137) continuously draws fluid from a reservoir (139) into the low pressure manifold, which is connected to a low pressure accumulator (141). A low pressure relief valve (143) returns fluid from the low pressure manifold to the reservoir through a heat exchanger (144) which is operable to influence the temperature of the working fluid and is controllable by the controller via a heat exchanger control line (146). A smoothing accumulator (145) is connected to the high pressure manifold between the pump and the hydraulic motor. A first high pressure accumulator (147) and a second high pressure accumulator (149) (together acting as the fluid compliance) are connected to the high pressure manifold through a first isolating valve (148) and a second isolating valve (150) respectively. The first and second high pressure accumulators may have different precharge pressures, and there may be additional high pressure accumulators with an even wider spread of precharge pressures. The states of the first and second isolating valves are set by the controller through first (151) and second (152) isolating valve signals respectively. Fluid pressure in the high pressure manifold is measured with a pressure sensor (153), which provides the controller with a high pressure manifold pressure signal (154). The pressure sensor may optionally also measure the fluid temperature and provide a fluid temperature signal to the controller. A high pressure relief valve (155) connects the high pressure and low pressure manifolds.

The hydraulic motor is connected to a generator (157), acting as the load, through a generator shaft (159). The generator is connected to an electricity network through a contactor (161), which receives a contactor control signal (162) from a generator and contactor controller (163) and is operable to selectively connect the generator to or isolate the generator from the electricity network. The generator and contactor controller receives measurements of voltage, current and frequency from electricity supply signals (167) and generator output signals (169), measured by electricity supply sensors (168) and generator output sensors (170) respectively, communicates them to the controller (112) and controls the output of the generator by adjusting field voltage generator control signals (165) in accordance with generator and contactor control signals (175) from the controller.

The pump and motor report the instantaneous angular position and speed of rotation of their respective shafts, and the temperature and pressure of the hydraulic oil, to the controller, and the controller sets the state of their respective valves, via pump actuation signals and pump shaft signals (171) and motor actuation signals and motor shaft signals (173). The controller uses power amplifiers (180) to amplify the pitch actuation signals, the isolating valve signals, the pump actuation signals and the motor actuation signals.

The WTG further comprises blade sensors (185) (which might comprise one or more of accelerometers, position sensors, velocity sensors or acoustic sensors) which communicate blade vibrations via blade sensor signals (187) to the controller.

Figure 2:
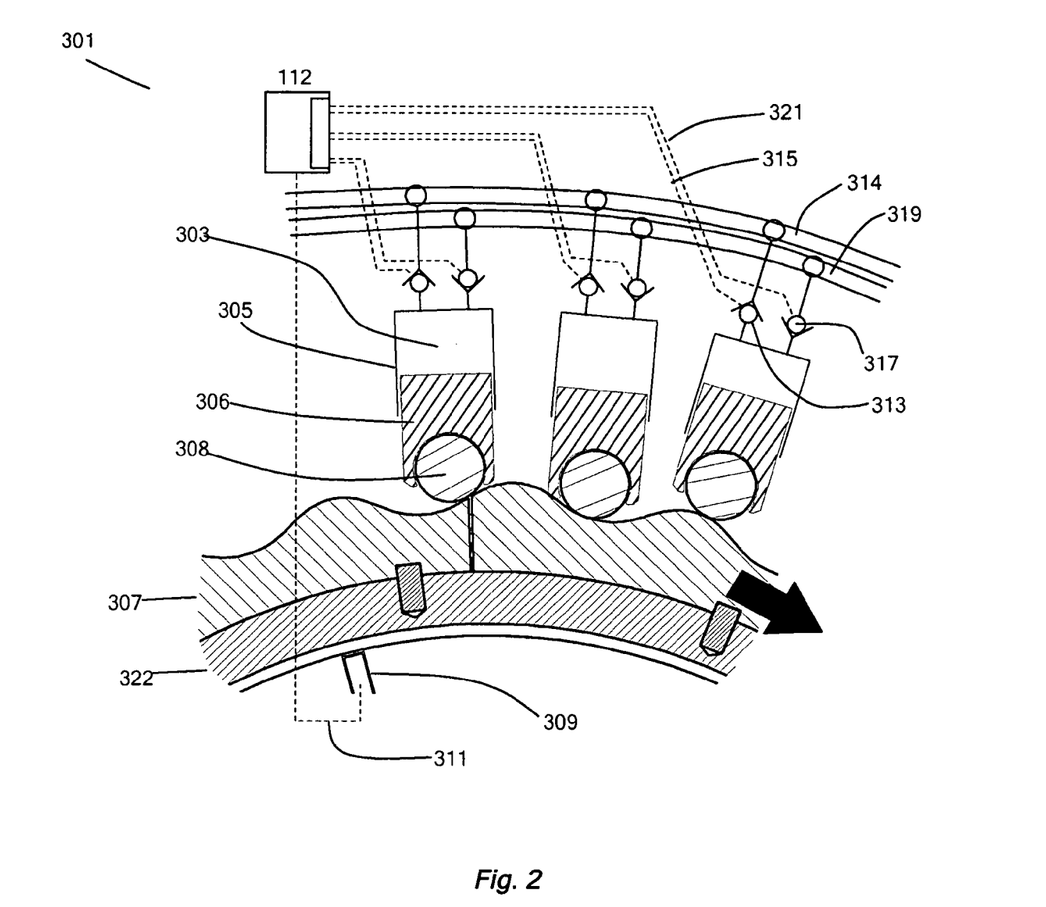
FIG. 2 shows a section of a pump according to the invention for use in the wind turbine generator of FIG. 1.

FIG. 2 illustrates in schematic form a portion (301) of the pump (129) with electronically commutated valves and a ring cam according to the invention. The pump consists of a number of similar working chambers (303) in a radial arrangement, of which only three are shown in the portion in FIG. 3. Each working chamber has a volume defined by the interior surface of a cylinder (305) and a piston (306), which is driven from a ring cam (307) by way of a roller (308), and which reciprocates within the cylinder to cyclically vary the volume of the working chamber. The ring cam may be broken into segments mounted on the shaft (322), which is firmly connected to the rotor shaft (125). There may be more than one bank of radially arranged working chambers, arranged axially along the shaft. Fluid pressure within the low pressure manifold, and thus the working chambers, greater than the pressure surrounding the ring cam, or alternatively a spring (not shown), keeps the roller in contact with the ring cam. A shaft position and speed sensor (309) determines the instantaneous angular position and speed of rotation of the shaft, and informs a controller (112), by way of electrical connection (311, being some of the pump actuation and pump shaft signals 171), which enables the controller to determine the instantaneous phase of the cycles of each individual working chamber. The controller is typically a microprocessor or microcontroller, which executes a stored program in use. The controller can take the form of a plurality of microprocessors or microcontrollers which may be distributed and which individually carry out a subset of the overall function of the controller.

There may be more than one bank of axially-spaced ring cams, the surfaces of which rotate together.

Each working chamber comprises a low pressure valve (LPV) in the form of an electronically actuated face-sealing poppet valve (313) which faces inwards toward the working chamber and is operable to selectively seal off a channel extending from the working chamber to a low pressure conduit (314), which functions generally (in the pumping mode) as a net source of fluid in use (or sink in the case of motoring). The low pressure conduit is fluidically connected to the low pressure manifold (135). The LPV is a normally open solenoid closed valve which opens passively when the pressure within the working chamber is less than the pressure within the low pressure conduit, during an intake stroke, to bring the working chamber into fluid communication with the low pressure manifold, but is selectively closable under the active control of the controller via an electrical LPV control signal (315, being some of the pump actuation and pump shaft signals 171) to bring the working chamber out of fluid communication with the low pressure manifold. Alternative electronically controllable valves may be employed, such as normally closed solenoid opened valves.

The working chamber further comprises a high pressure valve (HPV, 317) in the form of a pressure actuated delivery valve. The HPV faces outwards from the working chamber and is operable to seal off a channel extending from the working chamber to a high pressure conduit (319), which functions as a net source or sink of fluid in use and is in fluid communication with the high pressure manifold (133). The HPV functions as a normally-closed pressuring-opening check valve which opens passively when the pressure within the working chamber exceeds the pressure within the high pressure manifold. The HPV may also function as a normally-closed solenoid opened check valve which the controller may selectively hold open via an HPV control signal (321, being some of the pump actuation and pump shaft signals 171) and once the HPV is opened, by pressure within the working chamber. The HPV may be openable under the control of the controller when there is pressure in the high pressure manifold but not in the working chamber, or may be partially openable.

In a normal mode of operation described in the prior art (for example, EP 0 361 927, EP 0 494 236, and EP 1 537 333), the controller selects the net rate of displacement of fluid to the high pressure manifold by the hydraulic pump by actively closing one or more of the LPVs typically near the point of maximum volume in the associated working chamber's cycle, closing the path to the low pressure manifold and thereby directing fluid out through the associated HPV on the subsequent contraction stroke. The controller selects the number and sequence of LPV closures to produce a flow or apply a torque to the shaft (322) to satisfy a selected net rate of displacement. As well as determining whether or not to close or hold open the LPVs on a cycle by cycle basis, the controller is operable to vary the precise phasing of the closure of the LPVs with respect to the varying working chamber volume and thereby to select the net rate of displacement of fluid from the low pressure manifold to the high pressure manifold.

The pump has a dominant operating mode of selectively actuated pumping strokes whilst the ring cam rotates in the clockwise direction as illustrated in FIG. 2 (note that FIG. 2 illustrates the pump viewed from the opposite direction to its illustration in FIG. 1). In some embodiments it has alternative operating modes which include pumping whilst the cam rotates in the opposite direction, and motoring whilst rotating in either direction.

The controller is operable to use blade sensor signals (187) to select the timing of the opening and closing of the valves and thus schedule in time and angle the application of torque to the ring cam (and delivery or acceptance of flow to the high-pressure manifold) by the working chambers. One possible technique for this is disclosed in GB 1003000.5, which is hereby incorporated by reference.

The working chambers of the pump are canted. They do not directly radially outwards. The working chambers are canted about 10° in the clockwise direction in FIG. 2.

Figure 3:
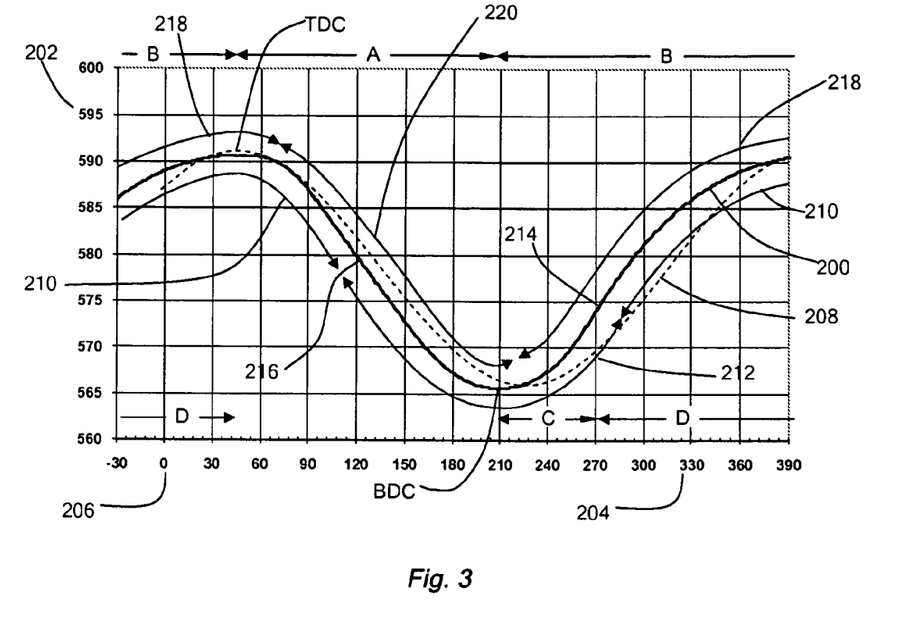
FIG. 3 shows a ring cam working surface profile for use in the pump of FIG. 2.

FIG. 3 shows one section of the cam profile (200) of the pump of FIG. 2, on which the roller (308) rolls in use. The profile is repeated typically 15-25 times on each ring cam bank, and forms an effectively continuous working surface around the ring cam. The cam profile is defined by the radius in mm (202) from the centre of rotation of the ring cam and the angle (204) from an arbitrary reference point (206) through one cycle of working chamber volume of the pump. The relative scale of the axes of FIG. 3 has been selected for clarity and so does not accurately portray the depth of the profile compared to the pitch (A) between the maxima (TDC) and the next adjacent minimum (BDC), nor the pitch (B) between minima (BDC) and the next maximum (TDC). FIG. 3 also shows a reference (sine wave) cam profile (208) to illustrate the difference between the ring cam according to the invention and a conventional ring cam.

The profile comprises a convex section (210) and a concave section (212), which meet at working (214) and breathing (216) points of inflexion. The working surface comprises a working region (218) extending over those areas of the working surface on which the roller rolls at any time when, in the dominant operating mode, the pressure in the working chamber significantly exceeds the pressure in the low-pressure manifold, for example it is over 100 Bar, due to the selective opening and closing of low and high pressure valves (313, 317) under the control of the controller. The working surface also comprises a breathing region (220) that extends over those areas of the working surface which are not subjected to forces from significant working chamber pressure, in the dominant operating mode.

The working regions form the majority of the face of the working surface extending over region B (which functions as the working face), and the breathing regions comprise the majority of the face of the working surface extending over region A (which functions as the breathing face). However, they do not align perfectly because of the compressibility of typical working fluids, for example hydraulic oil. At the beginning of a selected pumping stroke, the working chamber pressure rises monotonically over a small angle after the low pressure valve closes (which typically occurs at BDC but potentially occurs anywhere when the roller bears on the region B), meaning that the working region starts a little beyond BDC. After a selected pumping stroke, the working chamber is still pressurised for a small angle after the high pressure valve closes at TDC, extending the working region a little beyond TDC. This allows the commutation of working chambers alternately to the high and low pressure manifolds to occur with no significant pressure across the valves, increasing the efficiency of the fluid working machine/pump and decreasing the operating noise.

In the example embodiment, the pitch (angular separation A) between the maxima (TDC) and the next adjacent minimum (BDC) is less than the pitch (angular separation B) between minima (BDC) and the next maximum (TDC).

Thus, in the dominant operating mode, the exhaust stroke is longer than the intake stroke. Further, in use in the dominant operation mode, the slope of the working faces is less than the slope of the breathing faces. The Hertzian stress in the working surface is thus reduced, in comparison to machines of the prior art in which the working and breathing faces have a similar length. The side loads of the piston against the cylinder (305) are also reduced by the reduced slope of the working faces.

The angular separation (C) between the working face point of inflexion (functioning as the point of maximum slope magnitude) and the adjacent BDC is less than the angular separation (D) between working point of inflexion and the adjacent TDC, and in this embodiment C/D<90%. Thus, the maximum flow rate during exhaust (pumping) strokes occurs before the working chamber volume is at the mean of its volume at top dead centre and at bottom dead centre.

In the example embodiment, the maximum curvature of the convex portions of the working faces is less than one half of the maximum curvature of the convex portions of the breathing faces. Also the maximum curvature of the convex portions of the working faces is less than one half of the maximum curvature of the concave portions of the working faces.

The relatively flat, convex, region on the working face has a low curvature which reduces the Hertzian stress increase due to said convexity. In contrast, the relatively steep, concave, region has a high curvature which reduces the Hertzian stress increase due to said steepness. Due to the canting of the working chambers, the Hertzian stress in the region of the working point of inflexion is minimised by the sliding axis of the working chambers being close to perpendicular to the working surface in near the working point of inflexion.

The low curvature convex surface is necessarily larger (in terms of the arc covered, and in terms of working surface area) than the high curvature concave surface, and thus, the flow rate to or from the high pressure manifold via each working chamber, and therefore the torque applied to the rotatable ring cam, is asymmetric in time and angle. This contrasts with conventional fluid-working machines using eccentric cams in which, typically to achieve a smoother aggregate flow rate to or from the high pressure manifold from a plurality of working chambers, the flow rate due to each working chamber is designed symmetric in time and angle.

The ring cam and fluid working machine according to the invention has a lower stress in its working surface, and therefore longer lifetime, than ring cams according to the prior art.

Figure 4:
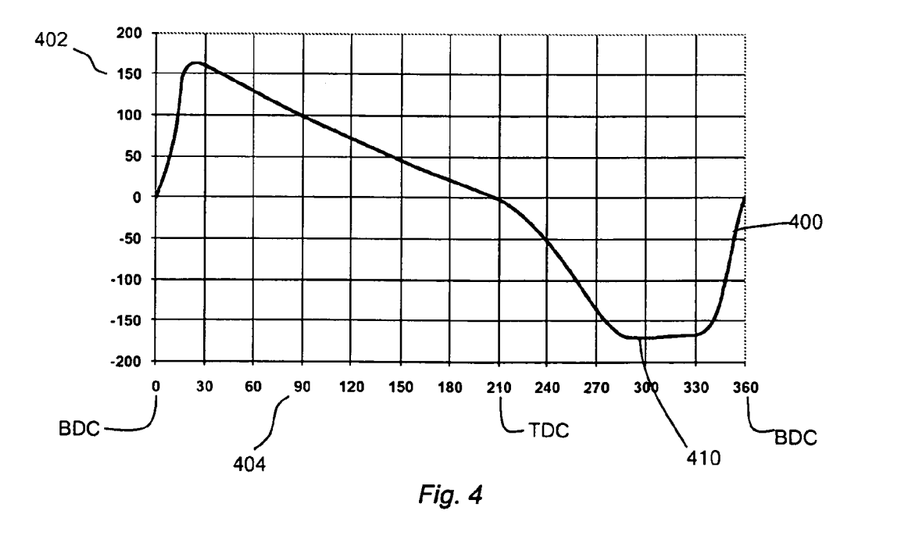
FIG. 4 shows the flow rate to and from a single working chamber of the pump of FIG. 2 when employing the ring cam profile of FIG. 3.

FIG. 4 illustrates the theoretical flow rate (400) to and from a single working chamber of the pump of FIG. 2 when employing the ring cam profile of FIG. 3. The vertical axis (402) measures flow (in L/min), against the angle (404) from BDC in FIG. 3. Positive values represent the contraction strokes in the dominant operating mode (i.e. flows to the low pressure manifold when not pumping, and flows to the high pressure manifold when pumping), while negative values represent the intake strokes.

In the example embodiment shown in FIG. 4, the rate of flow of working fluid during an exhaust stroke peaks before the volume of the respective working chamber reaches the mean of its volume at TDC and BDC. The flow of working fluid during an exhaust stroke is asymmetric about the angular midpoint of the working stroke because of the different curvatures of the convex and concave regions of the working face, and the flow is also asymmetric about the TDC and BDC points illustrated.

Also, the ring cam slope during the intake stroke is constant, which causes a relatively constant flow period (410). Thus the mean pressure drop (generally related to the square of the flow) through the low pressure valve (in the dominant operating mode) is lower than if a more peaked profile were chosen, and the energy consumed, by moving fluid into and out of the working chamber through the low pressure valve, is reduced.

The theoretical flow rate illustrated in FIG. 4 varies from the actual flow rate in use due to fluid compressibility, fluid leakage from the working chamber, and the dynamics of the high and low pressure valves. Further, the theoretical flow profile of FIG. 4 does not exactly match the slope of the cam profile of FIG. 3 due to the finite size of the roller, and the consequently varying contact angle.

The radius profile of the ring cam working surface of FIG. 3 has been selected so that, at least in use in the dominant operating mode of pumping and clockwise rotation, the working faces are subject to the lowest peak or mean stress, and so that the flow of fluid through the valves (in particular the low-pressure valves) caused by the operable engagement of the pistons with the working surface causes the minimal energy loss. The optimisation of the tradeoff between these and other competing criteria (such as aggregate flow smoothness) is within the skill of the competent designer.

The first and second high pressure accumulators (147,149, acting as the fluid compliance) and the ring cam being coupled to the hub and blade assembly (acting as a large inertial source) render the effect of the varying aggregate flow and torque, due to the asymmetric ring cam waves, on the WTG negligible. Furthermore, the controller (112) is operable to control the timing of the opening or closing of the electronically controlled valves of at least the pump to counter fluctuations in torque and flow arising from the asymmetric flow of working fluid out of the working chambers of the pump in use, using the blade sensor signal (187) to select the timing of the opening and closing of the valves and thus schedule in time and angle the application of torque to the ring cam (and delivery or acceptance of flow to the high-pressure manifold) to further, actively, cancel the effects of the asymmetric flow.

In some embodiments the working and breathing points of inflexion may be extended—that is to say, sections of the profile may be non-curved. Non-curved sections typically lie between the concave and convex portions of the profile.

In some embodiments the cam comprises a series of, typically identical, segments, abutting to form an effectively continuous working surface or surfaces. The working surface is typically treated for hardness, for example using nitriding techniques.

Further modifications and variations may be made within the scope of the invention herein described.

The invention claimed is:

1. A fluid-working machine for a renewable energy generation device, the fluid-working machine comprising:
    a ring cam,
    a plurality of working chambers, and
    a low-pressure manifold,
        the ring cam having an annular working surface extending around an axis of rotation of the ring cam, the annular working surface defining a plurality of waves,
        each working chamber having a piston, each piston in operative engagement with the ring cam working surface,
        the ring cam and working chambers being mounted to rotate relative to each other, cycles of working chamber volume being thereby coupled to rotation of the ring cam relative to the working chambers,
    wherein individual waves of the ring cam working surface have an asymmetric profile,
    wherein the waves have opposite first and second faces, each face extending between a maximum of radius relative to an axis of the rotation and a minimum of radius relative to the axis of the rotation,
    wherein one of the first and second faces is a working face on which cam following elements bear when a pressure in the working chamber is highest compared with a pressure in the low-pressure manifold and the other of the first and second faces is a breathing face, said working faces having convex portions and concave portions, and
    wherein a maximum curvature of the convex portions of the working faces is less than a maximum curvature of the concave portions of the working faces.

2. A fluid-working machine according to claim 1, wherein the profile of the plurality of waves are the same as each other and the working surface is rotationally symmetric.

3. A fluid-working machine according to claim 1, wherein the fluid-working machine has a first operating mode and a second operating mode in which the ring cam is configured to rotate in the opposite sense relative to the working chambers.

4. A fluid-working machine according to claim 3, wherein the profile of the plurality of waves of the ring cam is configured to cause the machine to operate more efficiently or have a longer expected operating lifetime in the first operating mode than the second operating mode.

5. A fluid-working machine according to claim 1, wherein the ring cam working surface comprises a plurality of waves having minima and maxima of radius relative to the axis of rotation and the working chamber volume cycles between a maximum when cam engaging elements engage with the ring cam at bottom dead centers, and a minimum when the cam engaging elements engage with the ring cam at top dead centers.

6. A fluid-working machine according to claim 1, wherein the volume of the working chamber varies cyclically with rotation of the ring cam, the fluid-working machine further comprises a high-pressure manifold, and a plurality of valves configured to regulate the flow of fluid between each working chamber and the low pressure and high-pressure manifold.

7. A fluid-working machine according to claim 6, wherein the plurality of valves are pressure-operated check valves, openable in one direction due to pressure across said valves.

8. A fluid-working machine according to claim 6, wherein at least one said valve associated with each working chamber is an electronically controlled poppet valve.

9. A fluid-working machine according to claim 1, wherein for each wave the first and second face have different arc lengths.

10. A fluid-working machine according to claim 1, wherein an arc length of the working faces is larger than an arc length of the breathing faces.

11. A fluid-working machine according to claim 1, wherein the pressure within a working chamber remains significantly above the low pressure manifold pressure in use while the respective cam engaging element bears on a first part of the breathing faces.

12. A fluid-working machine according to claim 1, wherein the maximum curvature of the convex portions of the working faces is less than a maximum curvature of the convex portions of the breathing faces.

13. A fluid-working machine according to claim 1, wherein the maximum curvature of the concave portions of the working faces is the same or greater than a maximum curvature of the breathing faces.

14. A fluid-working machine according to claim 1, wherein for at least some waves a point or region of maximum slope magnitude of the working surface intermediate the minimum of radius and the maximum of radius is not the same arc length from said minimum of radius as from said maximum of radius.

15. A fluid working machine according to claim 1, wherein an angular separation between a point or region of maximum slope magnitude of the working face and the adjacent bottom dead center is less than an angular separation between said point or region of maximum slope magnitude of the working face and the adjacent top dead center.

16. A fluid-working machine according to claim 1, wherein a point of maximum curvature intermediate the minimum of radius and the maximum of radius is not an angular separation half way between said maximum of radius and said minimum of radius.

17. A hydraulic circuit including a fluid-working machine according to claim 1, the hydraulic circuit comprising a further fluid working machine, and a fluid accumulator.

18. A kit configured to be assembled to form a fluid-working machine according to claim 1 and comprising:
the ring cam having the annular working surface defining the plurality of waves,
the individual waves of the ring cam working surface having the asymmetric profile, and
a mounting chassis comprising a plurality of cylinders, or cylinder mountings.

19. A renewable energy generation device comprising a fluid-working machine according to claim 1.

20. A renewable energy generation device according to claim 19, which is a wind turbine.

21. A method of operating a fluid-working machine comprising:
providing a fluid-working machine according to claim 1; and
rotating the ring cam relative to the working chambers and thereby causing the volume of the working chambers to vary cyclically.

22. A method of operating a fluid-working machine according to claim 21, wherein the working chambers remain fixed and the ring cam is rotated.

23. A method of operating a fluid-working machine according to claim 21, wherein a duration of intake and exhaust strokes is different.

24. A method of operating a fluid-working machine according to claim 21, wherein the rate of flow of working fluid during an exhaust stroke peaks before the volume of the respective working chamber reaches the mean of a volume of the respective working chamber at top dead center and bottom dead center.

25. A fluid-working machine for a renewable energy generation device, the fluid-working machine comprising:
a ring cam,
a plurality of working chambers, and
a low-pressure manifold,
the ring cam having an annular working surface extending around an axis of rotation of the ring cam, the annular working surface defining a plurality of waves,
each working chamber having a piston, each piston in operative engagement with the ring cam working surface,
the ring cam and working chambers being mounted to rotate relative to each other, cycles of working chamber volume being thereby coupled to rotation of the ring cam relative to the working chambers,
wherein individual waves of the ring cam working surface have an asymmetric profile,
wherein the waves have opposite first and second faces, each face extending between a maximum and an adjacent minimum, wherein one of the first and second faces is a working face on which the cam following elements bear when the pressure in the working chamber is highest compared with the pressure in the low-pressure manifold and the other of the first and second faces is a breathing face, and
wherein a maximum curvature of the concave portions of the working faces is the same or greater than a maximum curvature of the breathing faces.

* * * * *